United States Patent [19]

Avery

[11] 4,303,203
[45] Dec. 1, 1981

[54] CENTER PIVOT IRRIGATION SYSTEM HAVING A PRESSURE SENSITIVE DRIVE APPARATUS

[76] Inventor: Robert W. Avery, 4650 SW. 145th St., Apt. 62, Beaverton, Oreg. 97005

[21] Appl. No.: 71,073

[22] Filed: Aug. 30, 1979

[51] Int. Cl.³ .......................... A01G 27/00; B05B 3/00
[52] U.S. Cl. ................................................. 239/710
[58] Field of Search ............... 137/344, 236; 239/67, 239/70, 177, 212, 710, 720; 318/481, 645

[56] References Cited

U.S. PATENT DOCUMENTS

| | | | |
|---|---|---|---|
| 3,147,424 | 9/1964 | Miller | 318/481 |
| 3,184,667 | 5/1965 | Kufert | 318/481 |
| 3,233,832 | 2/1966 | Hallberg | 239/155 |
| 3,556,405 | 1/1971 | Harris | 239/177 |
| 3,558,257 | 1/1971 | Harris | 239/177 |
| 3,726,478 | 4/1973 | McMurray | 239/212 |
| 3,823,730 | 7/1974 | Sandstrom et al. | 239/212 |
| 3,901,442 | 8/1975 | Chapman | 239/99 |
| 4,034,778 | 7/1977 | Sage et al. | 239/177 |
| 4,067,497 | 1/1978 | Cornelius | 239/177 |
| 4,074,783 | 2/1978 | Arnodt et al. | 180/14 R |
| 4,108,200 | 8/1978 | Cornelius | 137/344 |
| 4,186,880 | 2/1980 | Jacobi et al. | 239/177 |

*Primary Examiner*—A. Michael Chambers

*Attorney, Agent, or Firm*—Klarquist, Sparkman, Campbell, Leigh, Whinston & Dellett

[57] ABSTRACT

A center pivot irrigation system includes an irrigation line supported by towers and rotatable about a central pivot. One tower thereof, for example the outermost tower, includes a drive motor energized in response to a signal from a pressure responsive control apparatus. The control apparatus is operable to sense the magnitude of the water pressure at a selected location in the line and therefore to sense decreases in such water pressure when the line travels uphill and increases in the pressure when the line travels downhill. The control apparatus produces a signal responsive to the sensed pressure which causes the drive motor to move the line at a rate inversely related to the average relative elevation of the line. That is, at faster rates of travel when the elevation of the line is below a reference elevation and at lower rates of travel when the elevation of the line is above the reference elevation to thereby prevent underwatering of uphill slopes and overwatering of downhill slopes. The selected location is preferably an equal area location such that the area traversed by the portion of the line from the pivot to the selected location is equal to the area traversed by the portion of the line from the selected location to its end. Thus, the sensed pressure is representative of the pressure at the equal area location.

29 Claims, 6 Drawing Figures

CENTER PIVOT IRRIGATION SYSTEM HAVING A PRESSURE SENSITIVE DRIVE APPARATUS

BACKGROUND OF THE INVENTION

1. Field of the Invention

The present invention relates to a center pivot irrigation line system having a drive apparatus for providing proper driving of the irrigation line over uneven terrain, and more particularly to such a system in which the irrigation line is driven at a rate dependent upon the magnitude of water pressure at a selected location in the line, and hence dependent upon the relative elevation of the line.

2. Description of the Prior Art

In a conventional center pivot irrigation system, an elongated irrigation line is supported at intervals by towers on wheels. At least one of such towers, usually the outermost tower, contains a prime or lead drive motor for moving this tower. The remaining towers each have drive motors operable to move them about the pivot in substantial alignment with the motion of the outermost tower. In one conventional system, the drive motor comprises an electrical induction motor which is energized by a percentage timer for a preselected subinterval of each minute so that the irrigation line travels at a uniform average rate about the pivot. However, when this system travels uphill, water pressure in the line decreases. As a result, the volume of water distributed from sprinklers spaced along the line diminishes with increased elevations in the line. Conversely, as the line moves downhill, water pressure in the line increases thereby increasing the volume of water distributed from the sprinklers. Consequently, with a uniform rate of travel, locations at lower elevations tend to be overwatered because of the relatively high line water pressures, while those at higher elevations are underwatered because of the relatively low line water pressure. Not only does this uneven irrigation hinder the uniform growth of vegetation in the irrigated area, water tends to form ponds in downhill regions, which can mire the irrigation line wheels and entirely stop its operation.

In an attempt to alleviate this problem, a pressure regulator or flow control device has been installed at each sprinkler head along a line to promote even distribution of water from the heads. However, there are typically up to 100 or more sprinkler heads along each such line so that, a large number of these devices are required. These devices are costly when installed in quantity and have limited life because of pressure caused deterioration of rubber valve materials typically included within them.

Another common prior art device comprises a programmed irrigation system which senses the angular position of the line about its pivot. A stored rate of travel instruction for that particular angular position controls the speed of the line. Similar programmed instructions are provided for each angular position of the line about its pivot. These devices are extremely costly and suffer from the added drawback that they must be custom programmed for each installation. Typically, such programming is not within the skill of a ranch hand or other individual who operates the line. Therefore, highly paid technicians must be transported to the installation site to program such a system for operation and to maintain it.

SUMMARY OF THE INVENTION

It is accordingly one object of the invention to provide a center pivot irrigation line system including a drive apparatus which compensates for unevenness in the terrain to be irrigated so as to insure substantially even irrigation of the land.

It is a further object of the invention to provide an improved center pivot type irrigation line system in which the rate of travel of the line about its pivot is progressively increased with decreases in elevation of the line relative to a reference elevation and the rate of travel is progressively decreased with increasing elevations of the line relative to the reference elevation, so as to distribute water evenly over uphill and downhill areas.

It is a further object of the invention to provide a center pivot irrigation line system having a drive apparatus which controls the rate of travel of the line in response to variations in the magnitude of water pressure sensed at selected point in the line, such that the rate of travel is higher for relatively higher sensed water pressure magnitudes and is lower for relatively lower sensed water pressure magnitudes.

It is another object of the invention to continuously control the speed of travel of a center pivot type irrigation system depending upon water pressure sensed at a selected location in the line.

It is a further object of the invention to control the speed of travel of an irrigation line system in response to the magnitude of water pressure sensed at an equal area location along the line, such that the area traversed by the portion of the line from the center pivot to such equal area location is approximately equal to the area traversed by that portion of the line from the equal area location to the end of the line.

It is a more specific object of the invention to energize an electrically operated drive motor of an irrigation line system for a time subinterval dependent upon the pressure sensed in the line at a location spaced from the pivot.

It is still another object of the invention to provide a drive apparatus which is relatively inexpensive, reliable, and easy to use and maintain.

These and other objects, features and advantages of the invention will become apparent from the following description which proceeds with reference to the accompanying drawings.

DETAILED DESCRIPTION OF PREFERRED EMBODIMENT

General Description of the Center Pivot Irrigation System

Figure 1:
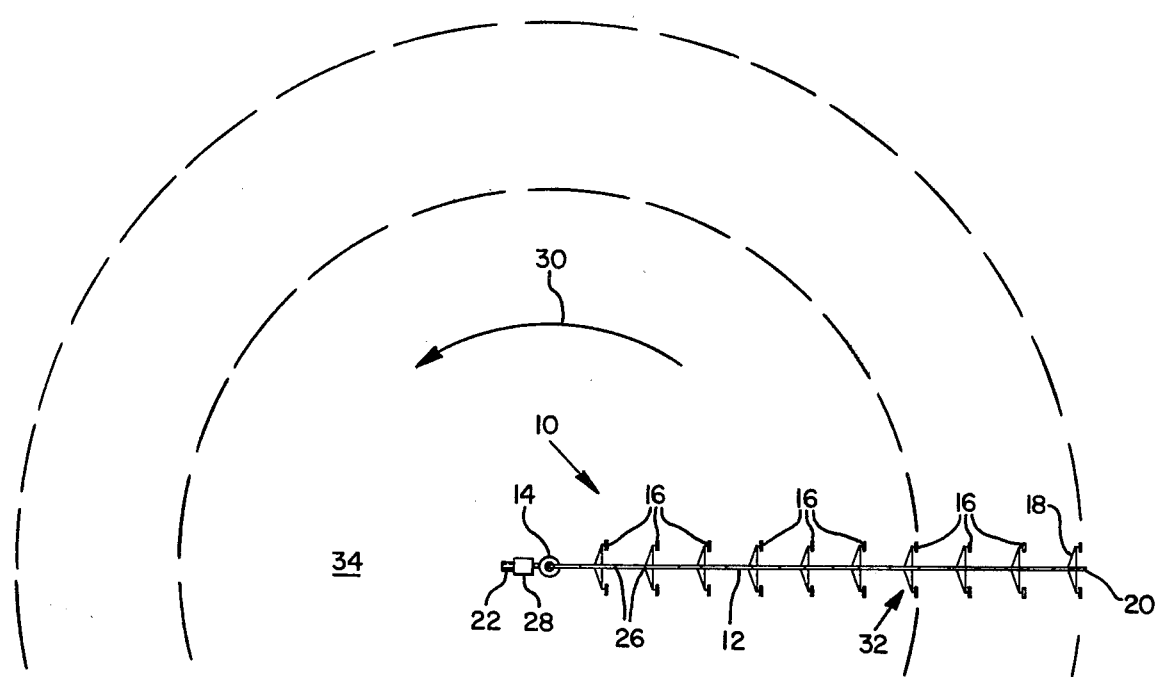
FIG. 1 is a plan view of a center pivot irrigation line system in accordance with the invention.
Figure 2:
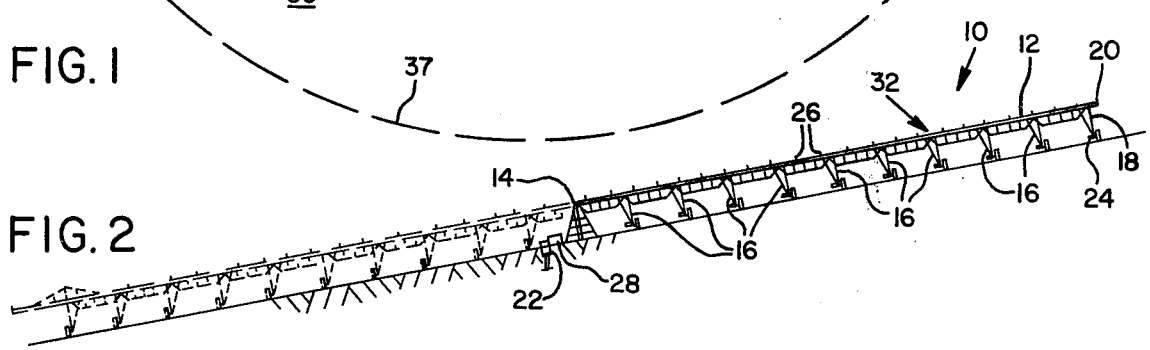
FIG. 2 is a side elevation view of the line of FIG. 1 with the line positioned on an uphill slope relative to the pivot.

Generally shown in FIGS. 1 and 2 is an irrigation system 10 of the center pivot type, including an irrigation pipeline 12 having a pivot end 14 which is pivotally secured relative to the ground. The line 12 is supported by plural towers 16, positioned at spaced intervals along its length, and an end tower 18 in association with the free end 20 of the line.

Line 12 is conventionally supplied at pivot 14 with water under pressure, such as from a pump 22. A pressure regulator (not shown) is typically employed at the pivot to maintain the magnitude of the water pressure at the pivot to a desired constant value determined by its setting.

Irrigation line 12 conventionally comprises a plurality of interconnected sections with each tower including a motor means appropriately powered for driving the wheels which support that tower. In order to maintain the line 12 in an aligned condition, it is known to actuate and deactuate appropriate motors upon a certain bending of the line 12 taking place, through, for example, a linkage system interconnecting sections of the line. Although not to be construed as a limitation, in the particular irrigation line system illustrated in FIGS. 1 and 2, the outermost tower 18 includes a lead or prime drive motor 24 and each of the remaining towers have a follower drive motor operable to drive such other towers in alignment with the driven end tower 18. In addition, although other types of drive motors may be employed, it is common for the drive motor 24 to be of the electrical induction type which is energized in response to an electrical control signal received from a control panel 28 at pivot 14.

As is conventional in an irrigation system of the type shown in FIG. 1, drive motor 24 is capable of driving the line 12 either counterclockwise, in the direction of arrow 30, or clockwise about the pivot.

As the line traverses about the pivot, the magnitude of water pressure or head in the line at a selected location spaced from the pivot, such as across a sprinkler orifice at location 32, will vary depending on the relative elevation of that portion of the line. More specifically, the magnitude of the water pressure at the selected location will decrease if the line is uphill with respect to pivot 14 and will increase if the line is downhill with respect to the pivot.

The selected point or location 32 along line 12 may be at an equal area location. For example, in a system having ten towers as illustrated in FIG. 1, such an equal area location is approximately at the seventh tower. By equal area location, it is meant a location 32 along the line such that the area traversed by the portion of the line from pivot 14 to location 32 is approximately equal to the area traversed by the portion of the line extending from point 32 to free end 20. That is, the area 34 bounded by a circle 35 shown in dashed lines in FIG. 2 with a center at pivot 14 and a radius equal to the distance from pivot 14 to point 32 is approximately equal to the annular area 36 bounded at its inner perimeter by circle 35 and at its outer perimeter by another dashed line circle 37 having its center at pivot 14 and a radius equal to the length of pipe 12. These areas will be equal when the ratio of the length of the line from pivot 14 to free end 20 to the distance from pivot 14 to location 32 is the square root of two. Hence, the seventh tower of a ten tower line is approximately at equal area location 32.

Because of variations in pressure as the line travels over uneven slopes, if the line traveled at a constant average rate about pivot 14, relatively uphill slopes would be relatively underwatered by sprinklers or nozzles 26 spaced along the line because of the lower pressure in the line when in these areas. Conversely, relatively downhill slopes would be relatively overwatered because the pressure in the line would be higher when the line traverses such areas.

To compensate for such underwatering and overwatering conditions resulting from changes in the elevation of the line, without the need for pressure or flow regulators at the sprinklers 26, a control apparatus is provided for adjusting the rate of travel of the line about the pivot in response to these changes in elevation. That is, the rate of travel decreases as the relative elevation of the line increases and increases as the relative elevation of the line decreases.

OVERALL DESCRIPTION OF THE DRIVE CONTROL APPARATUS

Figure 3:
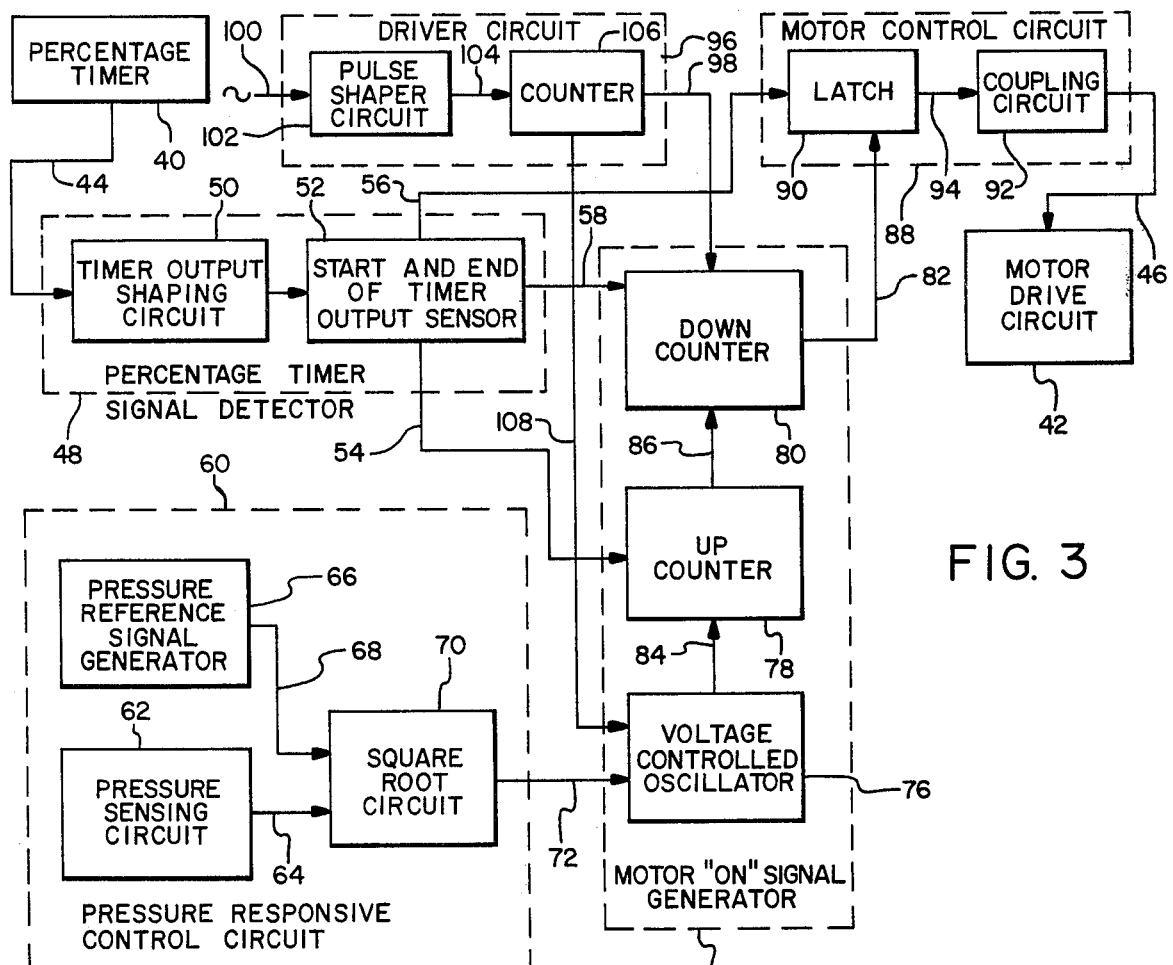
FIG. 3 is a block diagram of a drive control apparatus in accordance with the invention.

Referring to FIG. 3, the illustrated form of drive control apparatus of the invention includes a conventional percentage timer 40 which produces a periodic output signal on a line 44 of a duration established by a manual adjustment mechanism. One suitable timer is included in a center pivot irrigation system, designated PCM, which is commercially available from the Pierce Corporation, located in Eugene, Oreg. This particular timer produces a periodic output or energization signal which occurs during a subinterval of each interval of a series of periodic intervals. In particular, during each sixty second time period, timer 40 produces its energization signal during a preselected time subinterval.

If fed directly to motor drive circuit 42 located at end tower 18, this signal would energize drive motor 24 to move the tower for its duration. As such signals are of a constant preselected duration, if energized in this manner, the irrigation line system would rotate about the pivot at a uniform average rate producing the underwatered and overwatered areas as mentioned above. However, the drive control apparatus interrupts the percentage timer energization output on line 44 so that it does not reach the motor drive circuit 42. Instead, the drive control apparatus produces a replacement energization signal on a line 46 connected to motor drive circuit 42. The duration of this replacement control signal is not constant, but depends upon the elevation of the line relative to a reference elevation. More particularly, the replacement control signal is of a longer duration when the line is at lower relative elevations so that the center pivot irrigation system travels at faster rates, meaning a faster average rate as opposed to the instantaneous rate, as the elevation decreases. Conversely, the replacement signal is of shorter duration when the line is at higher relative elevations so that the line travels at slower rates under these conditions. Thus, the line spends more time when in relatively uphill positions in comparison to the time spent in relatively downhill positions. Therefore, even though water pressure in the line is lower when it is in such uphill positions, approximately the same volume of water is applied as when the line is in downhill positions.

Referring more specifically to the block diagram of FIG. 3, the output signal from percentage timer 40 is fed on line 44 to a percentage timer signal detector circuit 48, which detects the start and end of this output signal. Detector circuit 48 includes a timer output shaping circuit 50 which shapes the timer output signal into a wave form having a start and end which is easier to detect. Detector circuit 48 also includes a start and end of timer output sensor 52 which receives the output of shaping circuit 50 and is operable to produce, for purposes explained below, an output signal on line 54 at the start of the percentage timer output signal and an output signal on lines 56 and 58 at the end of such percentage timer output signal.

The drive control apparatus also includes an elevation detector or pressure responsive control circuit 60 for detecting the relative elevation of a portion of the line, such as at location 32. In the illustrated embodiment, pressure responsive control circuit 60 comprises a means for sensing the magnitude of the water pressure in line 12 applied at the selected location 32, which in turn represents the instantaneous elevation of the line at this location, and for producing an output signal representing the sensed pressure. In addition, when the selected location is an equal area location the sensed pressure magnitude represents an average elevation of the area traversed by the line.

Circuit 60 includes a pressure sensing circuit 62 such as a transducer for sensing the magnitude of the water pressure at location 32 and for producing a voltage output signal corresponding to the magnitude of the sensed pressure. This signal is transmitted on a line 64 to one input of a signal processing circuit such as a square root circuit 70. In addition, circuit 60 includes a pressure reference signal generator 66 for producing a reference voltage output signal on a line 68 corresponding to the magnitude of a desired reference pressure, for example to the average pressure at location 32. The signal on line 68 is fed to another input of square root circuit 70.

The signal processing circuit, in this case square root circuit 70, comprises a means for producing an output signal related to a function of the input signals, and hence to a function of the magnitudes of the sensed pressure and reference pressure. Thus, the output of circuit 70 is a function of the instantaneous elevation of the line at location 32 with respect to the average elevation of the line at this location. The flow through a typical nozzle is proportional to the square root of the magnitude of the water pressure at the nozzle. Therefore, in the preferred embodiment, a square root functional relationship between the rate of sensed pressure to reference pressure and thus between the duration of the output signal from percentage timer 40 to the duration of the replacement signal on line 46 is employed to more effectively compensate for changes in water flow through the nozzle 26 as a result of variations in line pressure. Thus, in the illustrated form, circuit 70 comprises a square root circuit for producing a voltage output signal on line 72 which is proportional to the square root of the quotient of the magnitude of the "sensed pressure" divided by the magnitude of the "reference pressure." By controlling the energization time of the motor 24 in accordance with this square root relationship of the sensed and reference pressures, a more uniform flow is achieved. Of course, for nozzles having a flow rate that is not proportional to the square root of the applied pressure, and for other applications, other processing circuits 70 generating other relationships of these pressures may be employed.

Looking again at FIG. 3, in the illustrated embodiment the signal on line 72 is thus related to the instantaneous elevation of the portion of the line at point 32 to the average elevation of the line at point 32. Furthermore, when position 32 is at an equal area location, this signal represents the square root of the quotient of the magnitude of the instantaneous pressure at point 32 in the line divided by the average pressure at point 32 in the line.

The drive control circuit also includes a motor "on" signal generator circuit 74 which, in one form, includes a voltage controlled oscillator 76, an up counter means 78 and a down counter means 80.

Motor "on" signal generator 74 produces an output signal on line 82 which varies in accordance with the magnitude of the input signal fed to oscillator 76 from square root circuit 70. In particular, the duration of the output signal on line 82 is proportional to the square root of the quotient of the magnitude of the pressure sensed by pressure sensing circuit 62 divided by the magnitude of the reference pressure established by generator 66 and therefore is responsive to changes in elevation of the line.

Voltage controlled oscillator 76 produces an oscillator output signal on a line 84 of a frequency dependent upon the magnitude of the signal voltage it receives on line 72. Higher frequencies are associated with higher sensed pressure magnitudes and lower frequencies are associated with lower sensed pressure magnitudes. Hence, the oscillator output frequency is also proportional to the square root of the quotient of the magnitude of the sensed pressure divided by the magnitude of the reference pressure.

At the start of the percentage timer output signal appearing on line 44, up counter 78 is initialized to a zero count by the signal occurring on line 54 from sensor circuit 52. Up counter 78 thereupon counts the cycles of the output signal from voltage controlled oscillator 76. At the end of the percentage timer output signal, down counter 80 is enabled by the signal on line 58 from sensor circuit 52 to receive the count reached by up counter 78 at this time. This count is relatively higher as the magnitude of water pressure sensed by transducer 62 increases and lower for decreases in sensed pressure magnitudes. At the same time, a signal on line 56 is fed to a motor control circuit 88 consisting, in the preferred form, a latch circuit 90 and coupling circuit 92. In response to this signal on line 56, latch 90 begins to produce an energizing output signal on a line 94 which is coupled by coupling circuit 92 to line 46 where it causes motor drive circuit 42 to energize motor 24 at end tower 18. Down counter 80 counts down at a fixed rate in response to triggering signals it receives from a driver circuit 96 on a line 98. When the count in down counter reaches zero, upon the next triggering signal, the down counter transmits a signal on line 82 to latch 90 stopping the production of the energization signal. Consequently, the energization signal on line 46 ends and the drive motor 24 stops operating.

Down counter 78 will take longer to reach the zero count condition with higher counts transmitted to it from up counter 78. Thus, the duration of the motor energization signal will last longer and the line will travel farther as the count transmitted from the up counter to the down counter increases. Furthermore, because higher counts are associated with higher sensed pressures and lower relative line elevations, the line will therefore travel at a faster rate as the relative elevation of the line decreases. The converse is true as the line elevation increases.

Driver circuit 96 is energized by a 120 volt 60 Hertz alternating current source transmitted to it on a line 100. More specifically, a pulse shaper circuit 102 of the driver circuit receives the signal on line 100. Pulse shaper circuit 102 modifies this received signal in a suitable manner to provide triggering pulses on a line 104 to a counter circuit 106 which is also included in the driver circuit. Counter 106 in turn produces periodic clocking signals on line 98 causing down counter 80 to count down.

As an optional feature, an output of counter 106 is fed on line 108 to oscillator 76 causing it to produce an output signal on line 81 having a minimum frequency regardless of the sensed pressure. As a result, latch 90 will produce its energization output signal for a minimum period of time during each periodic interval, for example during each minute, causing the driving of the irrigation line system at a minimum rate of travel about the pivot. This becomes important if, for example, it is desired to move the line to a particular location about the pivot when the line is upressurized or empty as the drive control apparatus will operate to move the line at this minimum rate even under these conditions.

Detailed Circuit Description Connection Block and Control Panel

Figure 4:
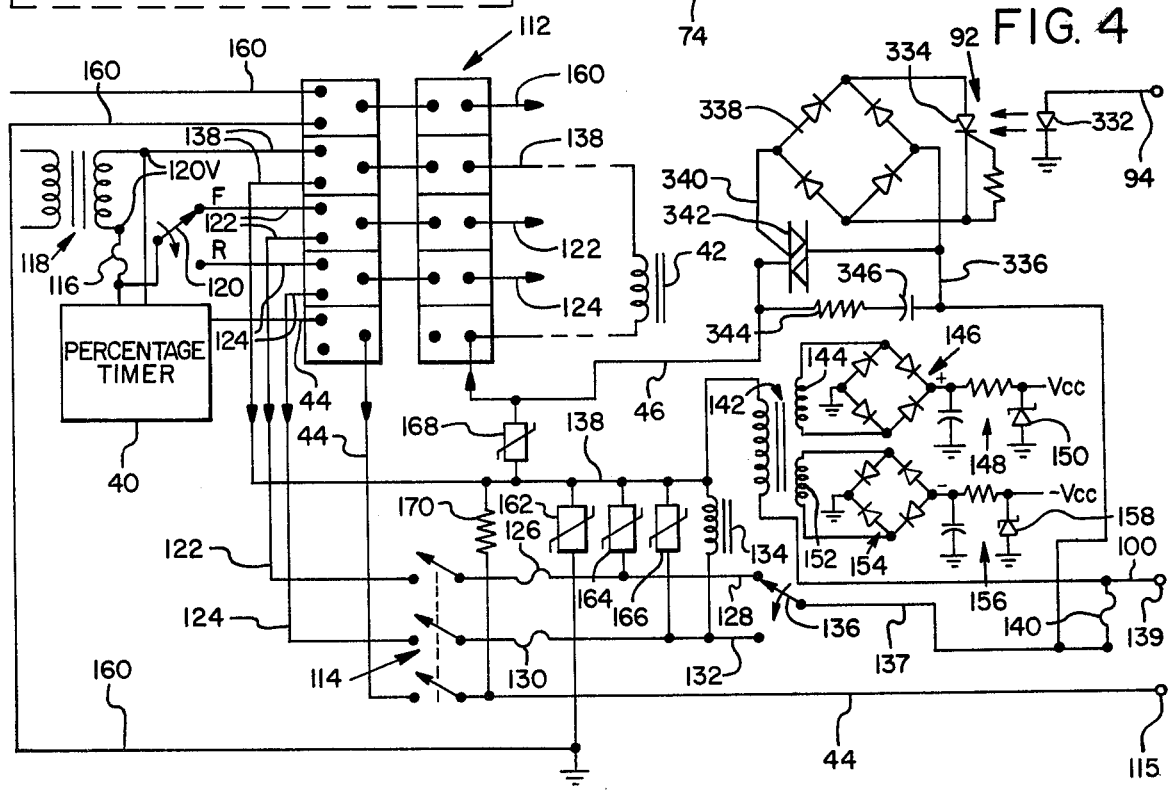
FIG. 4 is a detailed circuit diagram of a portion of the drive apparatus of FIG. 3.
Figure 5:
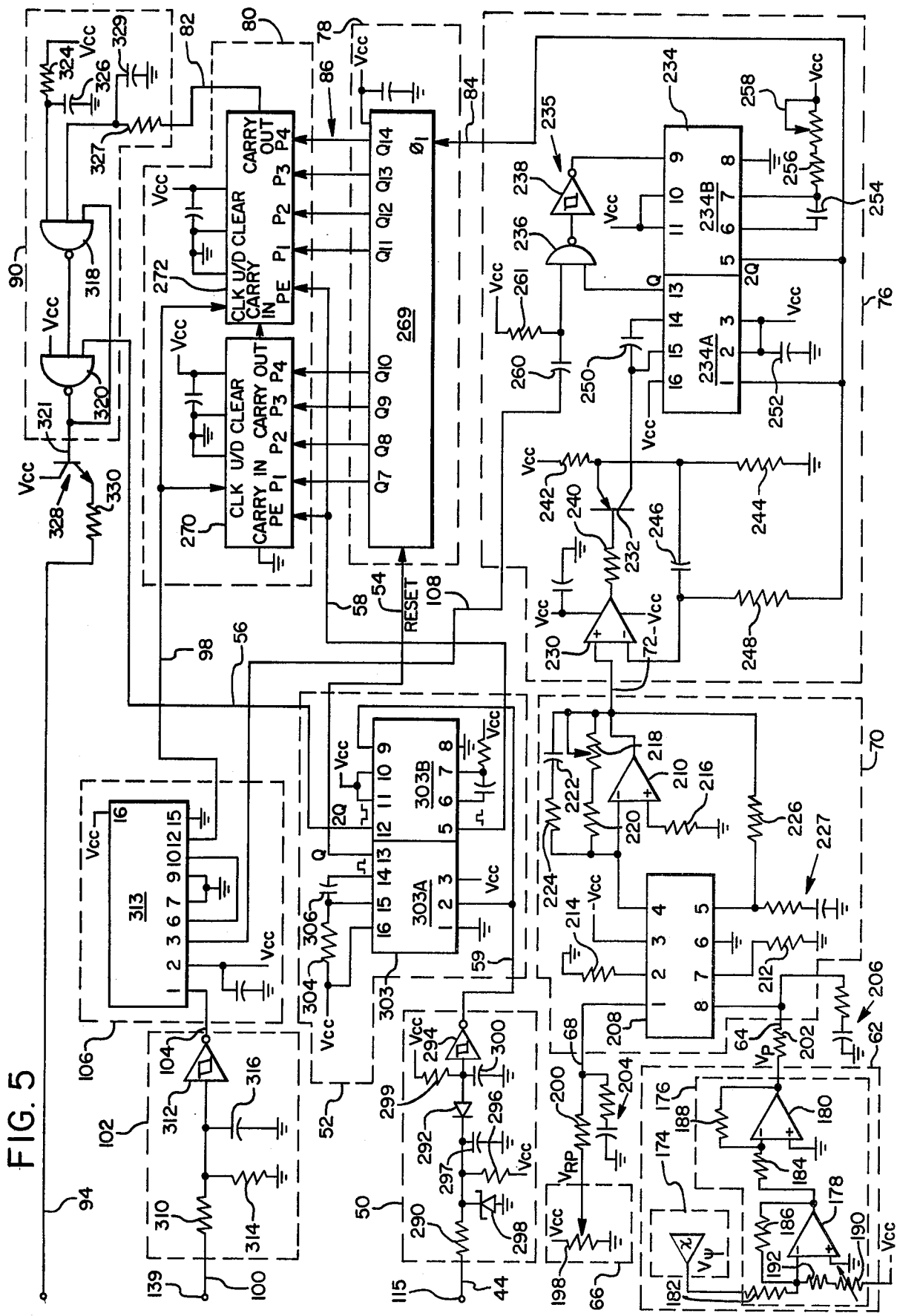
FIG. 5 is a detailed circuit diagram of an additional portion of the drive apparatus of FIG. 3.

With reference to FIGS. 4 and 5, as previously indicated, control panel 28 is provided at the pivot 14 and houses percentage timer 40. Percentage timer 40 may comprise a motor driven switch that revolves at one revolution per minute. An adjustable setting controls the duration of the subinterval of each minute that a motor energization control signal is produced by timer 40 on line 44. The output on line 44 is fed to a connection block 112 conveniently mounted at the seventh tower of a ten tower system so as to be positioned at approximately an equal area location as explained above. From connection block 112, the signal on line 44 is fed through a normally closed disconnect switch 114 to an input 115 of timer output shaping circuit 50.

The percentage timer 40 is energized by a 120 volt alternating current supply voltage from a transformer 118 which is fed to it through a fuse 116. Transformer 118 in turn is energized by an available electrical power source at pivot 14. The 120 volt alternating current supply is also connected through a switch 120 to either a line 122 or a line 124 depending upon the desired direction of rotation of the irrigation line about its pivot. In the illustrated embodiment, switch 120 is in its forward direction so that line 122 is energized and line 124 is dead. Line 122 is connected through the switch 114 and a fuse 126 to energize a line 128 while line 124 is connected through the switch and its fuse 130 to a line 132. A relay 134 controls a switch 136 to connect this switch either to line 128 or to line 132 depending upon which is energized. With lines 124, 132 de-energized as shown, relay 134 is also de-energized and the switch 136 is connected to line 128. Conversely, when line 132 is energized, current passes through relay 134 to the 120 volt alternating current supply ground line 138 and throws switch 136 from line 128 to line 132. From switch 136, power is fed on a line 137 through a fuse 140 to line 100 and hence to an input 139 of pulse shaper circuit 102. In addition, power from line 100 passes through the primary windings of a transformer 142 to the ground line 138. A first secondary winding 144 of transformer 142 feeds a conventional diode bridge circuit 146 which produces a positive direct current output voltage that is filtered by a resistor-capacitor filter 148 and regulated by a zener diode 150 to provide a direct current supply voltage output labeled $V_{cc}$. In the illustrated circuit, the voltage $V_{cc}$ is established at 12.5 volts. A similar circuit comprised of a transformer winding 152, bridge circuit 154, resistor-capacitor filter 156 and zener diode 158 operates to provide a negative direct current voltage supply, $-V_{cc}$, of $-12.5$ volts.

An equipment ground line 160 is also provided. Respective varistors 162 through 168 are each connected at one side to ground line 138 and at their other side to respective lines 160, 128, 132 and 46 protect the drive control circuit from line surges such as might be caused by lightning. In addition, a 47 K ohm resistor 170 connected between line 138 and line 44 reduces the input impedance of the drive control circuit to reduce any 60 Hertz coupling into this input from other sources, such as arising from capacitive coupling to the wires of a main power supply cable.

Also, drive motor control circuit 42 may comprise a 120 volt alternating current actuated solenoid connected between line 46 and the alternating current ground line 138. Solenoid 42 is energized by the energization signal appearing on line 46 to turn on motor 24 at end tower 18.

Pressure Responsive Control Circuit

As previously indicated, pressure responsive control circuit 60 comprises one means of detecting the instantaneous pressure of a portion of line 12 at a location 32 spaced from pivot 14. In particular, this circuit is designed to detect the relative elevation of the portion of line at an equal area location and provide an output representing the magnitude of the water pressure at the equal area location.

With reference to FIG. 5, the pressure sensing circuit 62 comprises a commercially available pressure transducer 174 which produces a direct current voltage output $V_4$ which is proportional to the pressure sensed by the transducer. Transducer 174 is positioned for sensing the water pressure in the line at location 32.

The output signal from transducer 174 is fed through a two-stage signal conditioning circuit 176 which adjusts this output signal to zero when the sensed line pressure is zero. In particular, conditioning circuit 176 includes a pair of op amps 178, 180 each having its non-inverting input grounded. The pressure transducer output voltage is fed through a 27 K ohm resistor 182 to the inverting input of op amp 178 which has its output fed through a 27 Kohm resistor 184 to the inverting input of op amp 180. A 27 Kohm negative feedback resistor 186 is connected between the output of op amp 178 and its inverting input. In addition, a 30 Kohm negative feedback resistor 188 is connected between the output of op amp 180 and its non-inverting input. The $-V_{cc}$ supply voltage is connected through a series combination of a 15 Kohm potentiometer 190 and a 120 Kohm resistor 192 to the non-inverting input of op amp 178. Adjustment of potentiometer 190 adjusts the output voltage of the signal conditioning circuit until it is at a desired level for a given input voltage from the pressure transducer 174. Thus, the output voltage $V_p$ from pressure sensing circuit 62 is proportional to the magnitude of the instantaneous pressure in the line at location 32. Also, $V_p$ is related to the elevation of the portion of the line at this location and, with position 32 at an equal area location.

One form of pressure reference signal generator 66 comprises a 10 Kohm potentiometer 198 connected between $V_{cc}$ and ground. In operation, potentiometer 198 produces an output voltage $V_{rp}$ which is inversely proportional to the magnitude of the reference pressure. For example, if the desired reference pressure is fifty pounds per square inch, $V_{rp}$ may equal 0.4 volts, and, if the desired reference pressure is one hundred pounds per square inch, then $V_{rp}$ may equal 0.2 volts. In particular, in the preferred embodiment, $V_{rp}$ is established at a value corresponding to the average magnitude of the water pressure level at location 32. Thus $V_{rp}$ represents an average or reference elevation of the line at location 32.

The signal $V_{rp}$ is fed across a 33 Kohm resistor 200 to line 68 and thence to one input of square root circuit 70. Similarly, the signal $V_p$ is fed through a 33 Kohm resistor 202 to line 64 at another input to this square root circuit.

Undesirable alternating current signals occurring on line 68 are removed by a filter 204 comprised of a series connected 10 Kohm resistor and 0.005 microfarad capacitor connected between line 68 and ground. A similar filter 206 connected between line 64 and ground filters alternating current signals from this line as well.

Square root circuit 70 comprises an analog multiplier circuit 208 together with an op amp 210 interconnected to produce an output representing the square root of the products of its inputs on lines 64 and 68. Because the voltage on line 68 is inversely proportional to the magnitude of the reference pressure, square root circuit 70 will produce an output proportional to the square root of the quotient of the sensed pressure magnitude divided by the reference pressure magnitude.

Multiplier 208 may comprise a commercially available three input multiplier circuit such as produced by Raytheon under its Model designation RC 4200. This multiplier has pin connections numbered in accordance with the numbering shown in FIG. 5 and receives the input from line 68 at pin 1 and the input from line 64 at pin 8. Pins 2 and 7 are each grounded through respective 33 Kohm resistors 212, 214 to convert the normally current sensitive device into a voltage sensitive multiplier. Pin 3 is connected to the $-V_{cc}$ potential while pin 6 is grounded.

The output signal from multiplier 208 fed on pin 4 to the inverting input of op amp 210 which in turn has its non-inverting input grounded through a 33 Kohm resistor 216. A primary negative feedback branch consisting of a 12 Kohm potentiometer 218 in series with a 27 Kohm resistor 220 connects the output of op amp 210 to its inverting input. A supplementary high pass feedback path comprising a series combination of 20 micromicrofarad capacitor 222 and a 2 Kohm resistor 224 is also connected between the output of the op amp and its non-inverting input to prevent the op amp from oscillating. Finally, the op amp output is connected through a 33 Kohm resistor 226 to input pin 5 of multiplier 208. A filter 227 comprising a 10 Kohm resistor connected in series with a 0.005 microfarad capacitor is connected between pin 5 and ground to filter undesirable transient signals at this input to the multiplier.

When connected in this manner, the output voltage on line 72 is equal to the square root of the product of the voltages $V_p$ and $V_{rp}$. Because $V_{rp}$ is inversely related to the magnitude of the reference pressure, this output voltage is proportional to the square root of the quotient of the sensed pressure magnitude divided by the reference pressure magnitude. As mentioned above, this reference pressure magnitude may conveniently be established to represent the average magnitude of the water pressure at point 32.

Voltage Controlled Oscillator

The voltage controlled oscillator 76 is designed to receive the input voltage on line 72 and produce an output signal on line 84 having a frequency which is proportional to the input voltage. Thus, the frequency of the oscillator output voltage will be proportional to the square root of the quotient of the magnitude of the sensed pressure divided by the magnitude of the reference pressure. Furthermore, because the measured pressure depends upon the relative elevation of location 32 of the line, this output frequency provides an indication of this relative elevation.

In the illustrated form, oscillator 76 includes the following basic components, an operational amplifier 230, a PNP transistor 232, a dual monostable multivibrator 234, and optionally a minimum frequency triggering circuit 235 comprising a Nand gate 236 and Schmidt trigger 238.

One suitable form of dual stage multivibrator 234 is produced by National Semiconductor Company as Model No. MM 74C221 having pins numbered as shown in FIG. 5.

The output of the square root circuit on line 72 is fed to the non-inverting input of op amp 230 which in turn has its output connected through a 10 Kohm resistor 240 to the base of transistor 232. Resistor 240 limits the base current transmitted to transistor 232 when line 12 is unpressurized. The positive $V_{cc}$ supply is connected through a 10 Kohm resistor 242 to the emitter of transistor 232. In addition, the emitter of this transistor is connected through a 10 megohm resistor 244 to ground and is also coupled through a 0.1 microfarad capacitor 246 to the inverting input of op amp 230. This non-inverting input is also connected through a 1 megohm resistor 248 to pins 1 and 5 of multivibrator 234. The collector of transistor 232 is connected to pin 15 of the multivibrator which in turn is coupled through a 0.1 microfarad capacitor 250 to pin 14. Capacitor 250 acts as the timing capacitor for the first multivibrator 234A of the dual multivibrator. Pins 2-3, 10-11 and 16 of multivibrator 234 are each connected to the positive voltage supply. In addition, pins 2 and 3 are also coupled to ground through a 0.01 microfarad filtering capacitor 252. Furthermore, pin 8 is grounded while a 0.1 microfarad timing capacitor couples pin 6 to 7. In addition, pin 7 is connected through a 51 Kohm resistor 256 and a 5 Kohm potentiometer 258 to the positive $V_{cc}$ supply. Adjustment of potentiometer 258 alters the timing of the 2Q output at pin 5 of the second multivibrator 234B of the dual multivibrator, which, in turn, adjusts the frequency output of oscillator 76 for a given input voltage on line 72. Potentiometer 258 is adjusted so that the voltage controlled oscillator output is sixty Hertz when the voltage at line 72 is one-third $V_{cc}$, which is the case when the pressure at location 32 equals the reference pressure. This 2Q output comprises the output of the voltage controlled oscillator and also a feedback signal through resistor 248 to the inverting input of op amp 230.

In many applications, it is desirable to be able to move the irrigation line from one position to another when the line is empty, that is unpressurized. Consequently, in such cases, it is desirable to drive the line at a minimum rate of travel independent of pressure so that the line can be moved when in this unpressurized state. To accomplish this, an optional circuit 235 is provided for triggering the multivibrator 234B at a minimum rate such that the frequency of the output at 2Q is at least equal to this minimum. As a specific example, this minimum frequency output is attained by transmitting a 30 Hertz signal from driver circuit 106, obtained as explained below, on line 108 through a capacitor 260 to one input of Nand gate 236. This input to gate 236 is also connected through a 180 Kohm resistor 261 to the positive V supply. The other input of gate 236 is fed by the Q output on pin 13 from multivibrator 234A. The output of Nand gate 236 is fed to a Schmidt trigger 238 having its output connected to pin 9 of multivibrator 234B. The output of Schmidt trigger 238 comprises triggering signal for multivibrator 234B.

The operation of oscillator circuit 76 is as follows. When line 12 is unpressurized, the signal on line 72 from square root circuit 70 is at zero volts and the output of op amp 230 is at zero or less depending upon the voltage level at its inverting input as explained below. Consequently, transistor 232 conducts heavily and its collector voltage drops below approximately two-thirds $V_{cc}$. As a result, when multivibrator 234A is triggered under these conditions to produce a positive Q output, capacitor 250 does not charge to a voltage level at or higher than two-thirds $V_{cc}$. Until capacitor 250 reaches this charge, multivibrator 234A remains on. Therefore, under these conditions, the Q output of multivibrator 234A continuously remains high and does not generate negative going triggering pulses that would trigger multivibrator 234B through Nand gate 236. Thus, multivibrator 234B is triggered only by the 30 Hertz signals received via line 108. Therefore, the oscillator 76 output is at this frequency. Also, under these conditions, feedback signals from the 2Q output fed through resistor 248 to the integrating capacitor 246 and thus to the inverting input of op amp 230. Capacitor 246 generates a direct current voltage signal at the inverting input of op amp 230 of a magnitude which is equal to the on-interval of multivibrator 234B in seconds multiplied by the output of multivibrator 234B multiplied by $V_{cc}$. Since, under these conditions, this voltage is higher than the voltage on line 72, the output of op amp 230 is driven to a negative voltage level. This in turn causes transistor 232 to conduct even more heavily as its base voltage is negative relative to its emitter voltage, thereby reinforcing the nontriggering state of multivibrator 234A.

In contrast, as the pressure in line 12 rises, the output of op amp 230 rises accordingly. This decreases the conduction of transistor 232 and, as a result, the voltage level of its collector will rise. Under normal line operating pressures, capacitor 250 will charge to a two-thirds $V_{cc}$ and will reach this level at faster rates as the output voltage of op amp 230 rises. This in turn will cause the transmission of Q output pulses from multivibrator 234A to increase so that this Q output goes between one and zero logic output states at a faster rate. This in turn triggers multivibrator 234B at a higher rate because it is being triggered both by signals at a fixed frequency from line 108 and from the Q output of multivibrator 234A. Therefore, the output frequency of oscillator 76 increases as the magnitude of the output voltage from square root circuit 70 increases in response to increasing sensed pressure magnitudes. The feedback loop from the 2Q output of multivibrator 234B through resistor 248 to the inverting input of op amp 230 stabilizes the oscillator output frequency at a value equal to the appropriate level for the given input voltage to oscillator 76 on line 72.

Conversely, as the sensed pressure in line 12 decreases, the magnitude of the output voltage from square root circuit decreases causing a corresponding decrease in the output voltage of op amp 230. This in turn causes transistor 232 to conduct more heavily so that its collector voltage decreases and approaches more closely to two-thirds $V_{cc}$. As a result, capacitor 250 changes more slowly to the two-thirds $V_{cc}$ triggering level and the Q output of multivibrator 234A changes less frequently. Therefore, multivibrator 234B is triggered less frequently and the frequency of the oscillator output signal decreases.

Therefore, the voltage controlled oscillator circuit 76 produces an output at a frequency proportional to the voltage of the input signal it receives from square root circuit 70. Hence, because a square root circuit 70 is being employed in the illustrated circuit, this output frequency is proportional to the square root of the quotient of the sensed pressure divided by the reference pressure and therefore represents the instantaneous elevation of the line relative to the average elevation of the line at location 32 where the pressure is being sensed.

Up Counter Means and Down Counter Means

The oscillator output signal is fed on line 84 to the triggering input $\phi_1$ of up counter means 78.

Preferably, up counter 78 comprises a multi-stage binary up counter, such as the fourteen-stage counter 269 shown in FIG. 5, which counts the cycles of the signal it receives on line 84. One suitable counter is a fourteen-stage ripple carry binary counter produced by National Semiconductor Company and designated Model No. CD 4020BC. Such a counter has 14 separate parallel outputs with each output corresponding to an associated significant figure of a binary count. That is, the seventh output represents the $2^7$ count, the eighth output the $2^8$ count and so forth. Because the count in the lower level is typically an insignificant portion of the total count achieved by up counter 269, in the illustrated embodiment only the count in preselected higher level outputs are transmitted to down counter means 80. More specifically, the parallel outputs $Q_7$ through $Q_{14}$, representing the eight highest outputs of counter 269 are utilized. In response to a signal appearing on line 54 at the end of the percentage timer 40 output signal, generated as explained below, counter 269 is reset to an initial zero count.

In one form, down counter means 80 comprises a pair of four-stage binary up/down counters 270, 272, such as produced by National Semiconductor Company under Model No. CD 4516, connected as follows. Parallel $P_1$ through $P_4$ inputs of down counter 270 are coupled to the $Q_7$ through $Q_{10}$ outputs of up counter 269 while similar parallel inputs $P_1$ through $P_4$ of counter 272 are coupled to outputs $Q_{11}$ through $Q_{14}$ of the up counter.

The respective enabling inputs PE of down counters 270, 272 receive a signal on line 58 at the end of the percentage timer 40 output signal, so that, at this time, the count at the $Q_7$ through $Q_{14}$ outputs of up counter 269 is transferred in parallel to the respective P inputs of the down counters. The carry input of down counter 270 is grounded and its carry output is connected to the carry input of down counter 272. In addition, the carry output of down counter 272 is transmitted on line 82 to latch 90 of the motor control circuit. Also, the up/down and clear inputs of counters 270, 272 are grounded so that down counters 270, 272 count downwardly from the initial count received from up counter 269 in response to clocking signals they receive on line 98 from driver circuit 96, generated as explained below.

In operation, upon detection of the start of the output signal from percentage timer 40, start and end of timer output sensor 52 produces an output on line 56 to motor control circuit 88 (FIG. 3) and causes it to transmit an energization signal to the motor drive circuit 42 (FIG. 4). This energization signal will continue until such time as a resetting signal appears on line 82 when the down counters 270, 272 have counted down past zero. At the start of the percentage timer output signal, up counter 269 is reset by a signal on line 54 and begins to count the output cycles of the oscillator 76. Upon completion of the percentage timer output signal, the count in up counter 78 is transferred to down counters 270, 272 in response to the enabling signal on line 58. Down counters 270, 272 commence counting toward zero and when they pass this state a signal is transmitted on line 82 to motor control circuit 88 (FIG. 3). This latter signal causes the motor control circuit to cease production of the energization signal to motor drive circuit 42 until the end of the next percentage timer output signal at which time a signal again appears on line 56. Thus, because the time it takes down counters 270, 272 to reach zero depends upon the count they receive from up counter 269, and thence upon the output frequency of oscillator 76, the energization signal will be proportional to the square root of the quotient of the magnitude of the pressure sensed by transducer 174 divided by the magnitude of the reference pressure. In fact, this signal will be proportional to the duration of the percentage timer output signal multiplied by the square root of this quotient. Thus, for increasing relative line elevations corresponding to lower sensed pressures, the energization signal will be shorter and the line will travel at a slower rate. The converse is true for decreasing relative line elevations.

Timer Output Shaping Circuit and Start and End of Timer Output Sensor

The 120 volts alternating current sixty Hertz output signal from percentage timer 40 is shaped or squared up by shaping circuit 50 so that the start and end of this output signal is easier to detect. In particular, the output of timer 40 is fed through a 51 Kohm resistor 290 to the cathode of a diode 292 having its anode connected to the input of a Schmidt trigger 294. A 10 Kohm resistor 296 is connected between the cathode of this diode and the positive $V_{cc}$ supply. Thus, resistors 290, 296 comprise a resistor divider network which reduces the magnitude of the input voltage to 20 volts RMS. A zener diode 298 having its cathode connected to the cathode of diode 292 and its anode grounded clamps the voltage at the cathode of diode 292 to a range of from zero to approximately 12.5 volts.

A 33 micromicrofarad capacitor 297 coupled between the cathode of diode 92 and ground reduces transient noise spikes at this point. Also, the positive $V_{cc}$ supply is connected through a 390 Kohm resistor 298 to the input of Schmidt trigger 294 while a 0.1 microfarad capacitor 300 is connected between this point and ground.

During those portions of a minute when percentage timer 40 is producing its output signal, diode 292 conducts and discharges capacitor 300 so that the voltage at the input to the Schmidt trigger drops to ground potential. This in turn causes the output of the Schmidt trigger to rise to the positive $V_{cc}$ voltage. Consequently, the output voltage on line 59 is high. When the voltage at the cathode of diode 292 rises to 12.5 volts, capacitor 300 charges towards this level at a rate established by the RC time constant of resistor 299 and capacitor 300. If the voltage across capacitor 300 does not rise above 0.7 $V_{cc}$, which is the case during the percentage timer output signal, the output of Schmidt trigger 294 remains high. In contrast, when percentage timer 40 stops producing its output signal, capacitor 300 is charged such that the voltage across it is above 0.7 $V_{cc}$. This causes the Schmidt trigger output to go to a logic zero level, where it remains until the percentage timer again produces its output signal. In this manner, the output on line 59 is at a logic one level during those periods that the percentage timer is producing its output signal and is at a logic zero level during those periods when the percentage timer is not producing an output signal.

The output of Schmidt trigger 294 is fed to start and end of timer output sensor 52 which, in the preferred form, comprises a dual stage monostable multivibrator 303. One suitable form of multivibrator is designated Model No. MM 74C221 and is produced by National Semiconductor Company. This circuit has pin connections as shown in FIG. 5. The first multivibrator 303A of this circuit detects the leading edge of the percentage timer output signal. In other words, it detects the positive going output of Schmidt trigger 294 which occurs when the percentage timer output begins. More specifically, multivibrator 303A produces a positive going pulse on line 54 at the rising edge of the signal from Schmidt trigger 294. The duration of this positive going pulse is established approximately 10.8 microseconds by a 720 Kohm timing resistor 304 and 15 micromicrofarad capacitor 306. This positive going pulse on line 54 resets the up counter to a zero count.

The second multivibrator 303B detects the falling edge of the output signal from Schmidt trigger 294, which occurs at the end of the percentage timer output signal. Upon the occurrence of this negative going change in the Schmidt trigger output, a negative going pulse is produced by multivibrator 303B on line 56 and is transmitted to motor control circuit 88 (FIG. 3) which causes the drive motor 24 to turn on as previously explained. Also, at the same time, a positive going pulse is produced by multivibrator 303B and is transmitted on line 58 to down counter means 80 to cause the transfer to it of the count from up counter means 78 as explained above.

DRIVER CIRCUIT

As mentioned above, one form of driver circuit 96 comprises a pulse shaper circuit 102 and a counter circuit 106 (FIG. 5). Pulse shaper circuit 102 receives a 120 volt alternating current 60 Hertz input signal on line 100 and operates as a squaring circuit to produce a signal with an output having sufficiently fast rise times to trigger counter circuit 106. The input signal to pulse shaper circuit 102 is fed through a 1 megohm resistor 310 to the input of a Schmidt trigger 312. A 100 Kohm resistor 314 connected between the Schmidt trigger input and ground operates with resistor 310 as a divider network to reduce the Schmidt trigger input voltage to 12 volts RMS. A 33 micromicrofarad capacitor 316 couples the Schmidt trigger input to ground and reduces noise spikes at this point. Schmidt trigger 312 squares up its sinusoidal wave input and produces an output on line 104 with fast rise times necessary for driving counter circuit 106.

In the illustrated embodiment, counter circuit 106 comprises a six-stage binary counter 313. One suitable counter is designated Model No. CD 4520BM and is produced by National Semiconductor Company.

The clocking input to down counter means 80 is taken on line 98 from the sixth stage binary output of counter 313. Inasmuch as counter 313 is triggered by Schmidt trigger 312 at a 60 Hertz rate, the clocking signal on line 98 will occur approximately once each second. More specifically, the frequency of this clocking signal will be sixty divided by $2^6$ power. In addition, the $2^0$ output stage of counter 313, occurring at a 30 Hertz rate, is fed on line 108 to voltage controlled oscillator 76 to trigger the oscillator at a minimum frequency as explained above.

Motor Control Circuit

The motor control circuit 88 (FIG. 3) produces an energization signal to motor drive circuit 42 (FIG. 4) of a duration proportional to the duration of the percentage timer output signal multiplied by the square root of the quotient of the magnitudes of the sensed pressure in the line divided by the reference pressure. In one form this circuit comprises a latch 90 and coupling circuit 92.

Latch 90 comprises a pair of three input Nand gates 318, 320 (FIG. 5) operable as a flip-flop or latch to produce a motor energization output on a line 321 which is coupled by the coupling circuit to the motor drive solenoid 42.

More specifically, Nand gate 318 receives a first input from the output of Nand gate 320 and a second input from the positive voltage $V_{cc}$ supply through a 20 megohm resistor 324. A 0.05 microfarad capacitor 326 couples this latter input to ground and together with resistor 324 acts as an RC filter to remove voltage noise spikes at this point. This second input insures that latch 90 is in an off state with a logical zero output on line 321 when the power is initially turned on. The third input to latch 318 is connected through a 1 meg ohm resistor 327 to the line 82. Resistor 327, together with a 58 micromicrofarad capacitor 329 which couples this third input to ground, comprises an RC filter which minimizes noise spikes on the line that could otherwise trigger the latch to an on state prematurely, ahead of the output on line 82.

Gate 320 receives a first input from the positive $V_{cc}$ voltage supply, a second input from the output of gate 318, and a third input on line 56 from the start and end of percentage timer output detector circuit 52.

When the system is initially energized, the second and third inputs to gate 318 are at a logic one, and the first input to gate 318, from the output of gate 320, is at a logic zero. Therefore, the output of gate 318 is at a logic one. In addition, the first input to gate 320 is at a logic one, the second input to gate 320 from gate 318 is at a logic one, and the third input to gate 320 from multivibrator 303B on line 56 is also at a logic one. Consequently, the output of gate 320 is at a logic zero level.

At the end of the output from percentage timer 40, a negative going pulse on line 56 is fed to the third input of gate 320. As a result, the output of this gate goes to a logic one level and, as this output is fed to the first input of gate 318, all of the inputs to gate 318 are then at a logic one level. Therefore, the output of gate 318 goes to a logic zero and appears at the second input to gate 320. This in turn maintains the output of gate 320 at a logic one level even after the input to gate 320 on line 56 changes to a logic one level following the termination of the pulse on this line from multivibrator 303B.

Latch 90 remains in this state and produces a logic one output on line 321 from gate 320 until such time as the counter 80 counts down past zero. At this time, a logic zero is transmitted on line 82 to the third input of gate 318 and causes this gate to produce a logic one output. This in turn places all of the inputs to gate 320 at a positive logic level so that the output of gate 320 becomes a logic zero and thus latch 90 returns to its initial state. Latch 90 remains in this initial state and continues producing a logic zero output on line 321 until the end of the next percentage timer output signal, when the process repeats.

Coupling circuit 92 includes an emitter follower NPN transistor 328 having its collector connected to the positive $V_{cc}$ supply voltage and its base driven by the output on line 321 from latch 90. The emitter of transistor 328 is connected through a 390 ohm resistor 330 to the anode of a light-emitting diode (LED) 332 (FIG. 4) which has its cathode grounded. Whenever the latch output is at a logic one, transistor 328 conducts and causes LED 332 to generate a light signal. Coupling circuit 92 also includes a silicon controlled rectifier (SCR) circuit 334 which is optically coupled to LED 332 such that the SCR is turned on by light emanating from the LED. When the SCR turns on, the impedance seen by the trigger input of a triac 342 between a trigger input line 340 and a triac input line 336 is reduced below the triac firing threshold, causing triac 342 to fire. Bridge rectifier 338 connects SCR 334 to the triac trigger circuit such that the voltage potential on the SCR is of the same polarity for both half cycles of each cycle of a 120 volt alternating current supply voltage fed from line 137 on a line 336 to bridge 338. Thus, when fixed, the SCR and triac conduct on both half cycles. A series combination of a 10 ohm resistor 344 and a 0.1 microfarad capacitor 346 connected between line 46 and line 336 prevents spontaneous turning on of the triac due to rapid voltage rises in the line.

When fired, triac 342 produces the drive control output signal on line 46 which is fed to the solenoid 42 of the motor drive circuit causing the drive motor 24 at end tower 18 to operate. Triac 342 fires for the duration of time that LED 332 is energized and hence for the duration of the positive latch output signal. Thus, the energization signal on line 46 has a duration proportional to the percentage timer output signal multiplied by the square root of the quotient of the magnitude of the sensed pressure divided by the reference pressure.

Operation of Center Pivot Line Irrigation System

The operation of the illustrated irrigation system will be described with reference to the timing diagram of FIG. 6.

Percentage timer 40 is adjusted to produce an output having a desired duration for operation of the system on level ground.

The pressure reference signal generator 66 is adjusted to produce a signal representing a desired reference pressure, such as equal to the desired pressure at pivot 14. Pressure sensing circuit or transducer 62 senses the pressure in line 12 at a selected location 32 along the line, such as at an equal area location, and transmits a signal representing the sensed pressure to square root circuit 70, which also receives the signal from pressure reference signal generator 66. Square root circuit 70 in turn produces an output signal of a magnitude proportional to the square root of the quotient of the magnitude of the sensed pressure divided by the magnitude of the reference pressure and transmits this output signal to voltage controlled oscillator 76. Oscillator 76 operates to produce an oscillator output signal on line 84 of a frequency dependent upon this input voltage. The frequency of this output is higher for higher sensed pressure magnitudes corresponding to lower relative elevations of the line and is lower for lower sensed pressure magnitudes corresponding to higher relative elevations of the line.

Figure 6:
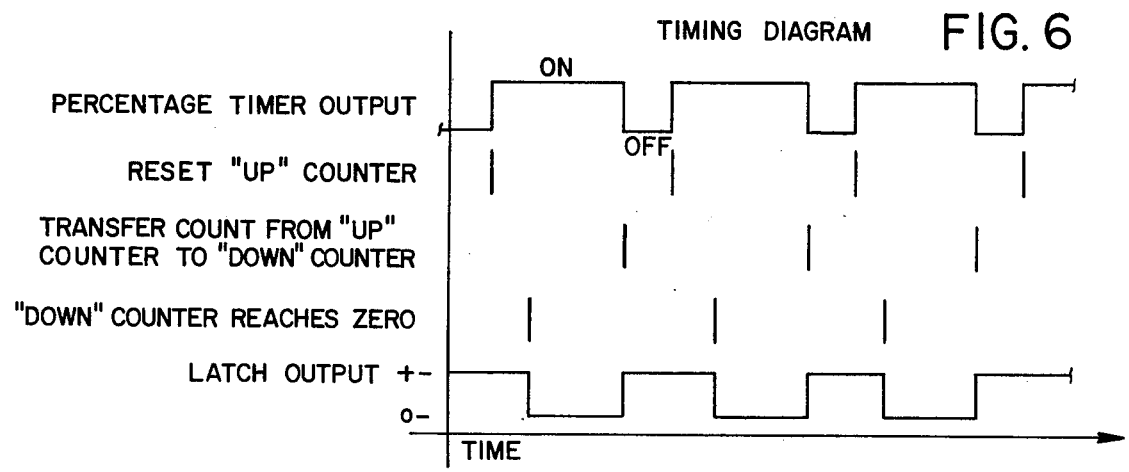
FIG. 6 is a timing diagram for the circuit of FIGS. 4 and 5.

Upon the occurrence of the percentage timer output signal, the up counter 78 is reset by a reset signal shown in FIG. 6, to an initial zero count by a pulse from the start and end of timer output sensor 52. Following resetting, counter 78 counts the output cycles of the oscillator output signal. At the end of the percentage timer output signal, down counter 80 is enabled by a transfer or enabling signal from start and end of timer output sensor circuit 52 to receive the count stored in preselected stages of the up counter. The down counter then commences counting down towards zero in response to triggering pulses from a driver or clocking circuit 96. Also, at the time the count is transferred from up counter 78 to down counter 80, latch 90 produces a motor control signal which is transmitted to the motor solenoid 42 and causes motor 24 to run. Operation of the motor continues as the down counter counts down. When the down counter passes a zero count, the motor control signal from latch 90 terminates and the motor stops running.

The magnitude of water pressure in the line at a location 32 spaced from pivot 14 varies depending upon the relative elevation of the line. Consequently, the magnitude of water pressure in the line provides a measurement of the relative elevation of the line. Furthermore, the reference pressure signal constitutes a representation of a reference elevation such as the average elevation of location 32. Thus, the driver control circuit compares the elevation of the line at the location where the pressure is sensed with a reference elevation, and controls the average rate of travel of the line in response to changes in line elevation and line pressure.

Furthermore, this control operates to move the line at faster average rates of travel when the line is at relatively lower elevations and slower rates of travel when the line is at relatively higher elevations. Consequently, the line spends more time traversing relatively uphill areas where location 32 is above the average elevation of this location in comparison with time spent in downhill areas. As a result, even though water pressure in the line is lower when the line is in such uphill areas, a more uniform volume of water is dispersed in comparison to the amount dispersed when the line is in downhill areas and at higher pressures.

Although the preferred embodiment has been described in connection with one form of circuit, it is to be understood that other circuits are equally suitable for carrying out the invention. For example, the invention may be carried out using a multiprocessor which has been programmed in a straightforward manner in accordance with the above description.

While I have shown and described a preferred embodiment of my invention, it will be apparent to those skilled in the art that changes and modifications may be made without departing from my invention in its broader aspects.

I claim:

1. A drive motor control apparatus for a center pivot irrigation line having plural towers, a drive motor at a lead one of such towers and a timer for periodically transmitting a control signal to the drive motor, the drive motor being energized in response to the control signal so as to move the line about its pivot for the duration of the control signal, comprising:

means for interrupting the transmission of the control signal from the timer to the drive motor at the lead tower;

control signal generator means for generating a replacement control signal of a duration which varies with variations in the magnitude of pressure in the line at a preselected location;

means for transmitting said replacement control signal to the drive motor so that the drive motor moves the line about its pivot for the duration of the replacement control signal.

2. An apparatus according to claim 1 in which said control signal generator means comprises pressure transducer means for sensing the magnitude of water pressure in the line at a preselected location spaced from its pivot and for producing a sensed pressure voltage signal of a magnitude proportional to the magnitude of the sensed water pressure, reference pressure circuit means for generating a reference pressure voltage signal of a magnitude related to the magnitude of a reference pressure, square root circuit means coupled to said transducer means and to said reference pressure circuit means for receiving the sensed pressure voltage signal and the reference pressure voltage signal, said square root circuit means comprising means for producing a square root circuit output voltage signal of a magnitude proportional to the square root of the quotient of the magnitude of the sensed pressure divided by the magnitude of the reference pressure, and motor energization signal generator means coupled to said square root circuit means for receiving the square root circuit output voltage signal, and said motor energization signal generator means comprising means for generating the replacement control signal of a duration proportional to the square root circuit output voltage signal and thereby proportional to the square root of the quotient of the magnitude of the sensed pressure divided by the magnitude of the reference pressure.

3. An apparatus according to claim 2 in which said motor energizing signal generator means includes voltage controlled oscillator means coupled to said square root circuit means for receiving the square root circuit voltage output signal and for producing an oscillator output signal at a frequency proportional to the square root circuit output voltage signal, detector circuit means coupled to the timer for receiving the control signal and for producing a start signal output at the beginning of each control signal and an end signal output at the end of each control signal, up counter means connected to said detector circuit means for receiving said start signal output and initializing the count in said up counter means to an initial state in response to such start signal output, said up counter means being connected to said voltage controlled oscillator means for receiving the oscillator output signal and operable to count the cycles of such oscillator output signal, down counter means connected to the output of said up counter means and to said detector circuit means for receiving the end signal, said down counter means being operable upon receipt of said end signal output to receive an output from said up counter means representing at least a portion of the count in said up counter means at the time of said end signal output and to count down the output received from said up counter means, latch circuit means for producing the replacement signal, said latch circuit means being coupled to said detector circuit means for receiving end signal output, said latch circuit means being operable to start producing said replacement signal upon receipt of said end signal output, said latch circuit means also being coupled to the output of said down counter means and responsive thereto to stop production of the replacement signal upon said down counter means counting down to its initial state.

4. An apparatus according to claim 3 in which said up counter means comprises a multi-stage binary counter having plural parallel outputs with each such output associated with a respective one of such stages, said down counter means comprising a binary counter having plural inputs for receiving in parallel outputs from predetermined stages of said up counter means at the time said down counter means receives said end signal output.

5. An apparatus according to claim 3 including triggering means connected to said voltage controlled oscillator means for triggering said voltage controlled oscillator means to produce an oscillator output signal of a minimum frequency established by said triggering means to thereby produce a replacement signal of a minimum duration.

6. An apparatus according to claim 3 in which said transducer means is positioned to sense the magnitude of water pressure in the line at an equal area location such that the ratio of the distance from the pivot to the end of the line to the distance from the pivot to the equal area location is approximately equal to the square root of two.

7. An apparatus according to claim 6 in which said reference pressure circuit means comprises means for producing a reference voltage signal representative of the magnitude of the pressure at the pivot.

8. An apparatus according to claim 6 in which said reference pressure circuit means includes means for adjusting the reference voltage signal.

9. A drive apparatus for moving a lead tower of a center pivot irrigation line and thereby follower towers and the line about its pivot whose relative elevation is zero comprising:

drive means for moving the lead tower about the pivot;

control means for controlling said drive means, said control means being responsive to the magnitude of water pressure sensed in the line at a location spaced from the pivot relative to the magnitude of a predetermined reference water pressure the magnitude of water pressure at such spaced location being lower when the spaced location is at an elevation higher than the elevation of the pivot and higher when the spaced location is at an elevation lower than the elevation of the pivot, said control means controlling said drive means to move the lead tower about the pivot at a slower rate of travel when the spaced location is at a higher elevation relative to the elevation of the pivot and for moving the lead tower about the pivot at a faster rate of travel when the spaced location is at a lower elevation relative to the elevation of the pivot.

10. A drive apparatus according to claim 9 in which said drive control means comprises means for controlling said drive means to progressively increase the rate of travel of the lead tower with decreasing elevations of the spaced location relative to the pivot and to progressively decrease the rate of travel of the lead tower with increasing elevations of the spaced location relative to the pivot.

11. A drive apparatus according to claim 9 or 10 in which said spaced location is at an equal area location such that the ratio of the distance from the pivot to the end of the line to the distance from the pivot to the equal area location is approximately equal to the square root of two.

12. A drive apparatus according to claim 9 or 10 in which said drive control means includes means for generating a reference pressure signal representing the magnitude of the reference water pressure and corresponding to a reference elevation, said sensing means comprising means for producing a pressure indicating signal representing the magnitude of the sensed pressure in the line at such spaced location, said drive means being responsive to said pressure indicating signal and said reference pressure signal for moving the line about its pivot at a rate proportional to the square root of the quotient of the magnitude of the sensed pressure divided by the magnitude of the reference pressure.

13. A drive apparatus according to claim 12 including means for varying the reference pressure signal to thereby vary the rate of travel of the lead tower.

14. A drive apparatus according to claim 12 in which said means for generating a reference pressure signal comprises means for generating such a signal which is representative of the average magnitude of the water pressure at the location spaced from the pivot.

15. A drive apparatus for moving a lead tower of a center pivot irrigation line and thereby follower towers and the line about its pivot comprising:

motor means mounted to the lead tower and operable when energized to move the lead tower about the pivot;

sensing means for sensing the magnitude of water pressure in the line at a predetermined location and for producing a first electrical signal corresponding to the sensed water pressure magnitude;

drive motor control means for controlling the operation of said motor means, said drive motor control means including means for establishing a second electrical signal corresponding to the magnitude of a predetermined reference water pressure, comparator means for comparing the first and second signals and for producing a comparator output signal corresponding to the compared first and second signals, and means responsive to said comparator output signal for periodically energizing said motor means for energization time intervals of durations which increase with increases in the sensed pressure relative to the reference pressure and which decrease with decreases in the sensed pressure relative to the reference pressure, to thereby increase the overall speed of travel of the irrigation line with increases in the sensed pressure relative to the reference pressure and decrease the overall speed of travel of the line with decreases in the sensed pressure relative to the reference pressure.

16. A drive apparatus for moving a lead tower according to claim 15 in which said sensing means senses the magnitude of water pressure in the line at a location spaced from the pivot.

17. A drive apparatus for moving a lead tower according to claim 15 in which said sensing means senses the magnitude of water pressure in the line at a location spaced from the lead tower.

18. An apparatus for controlling the energizing of a drive motor of a lead tower of a center pivot irrigation line to control the rate of travel of the lead tower and thereby follower towers and the line about its pivot comprising:
sensing means for sensing water pressure in the line at a predetermined location;
timer means for generating periodic timing signals, each such timing signal being of a predetermined duration which comprises a portion of an associated time interval of a series of successive time intervals, such time intervals also being of a predetermined duration;
control means responsive to said sensing means and to said timing signals for energizing the drive motor during an energization time subinterval of each such time interval, said control means comprising means for energizing the drive motor for one energizing time subinterval when the sensed pressure is at one magnitude, and for energizing the drive motor for a shorter energization time subinterval when the sensed pressure is at a lower magnitude.

19. An apparatus according to claim 18 in which said sensing means continuously senses the magnitude of water pressure in the line; and
said control means comprises means for increasing the duration of such energization time subintervals with increasing sensed pressure magnitudes and for decreasing the duration of such energization time subintervals with decreasing sensed pressure magnitudes.

20. An apparatus according to claim 18 or 19 in which said sensing means comprises means for sensing the magnitude of water pressure in the line at an equal area location such that the ratio of the distance from the pivot to the end of the line to the distance from the pivot to the equal area location is approximately equal to the square root of two.

21. An apparatus according to claim 18 or 19 in which said control means includes means for generating a reference pressure signal representing the magnitude of a reference pressure, said sensing means comprising means for producing a pressure indicating signal representing the magnitude of the sensed pressure in the line at the predetermined location, said control means being responsive to said pressure indicating signal and reference pressure signal for energizing the drive motor for energization time subintervals which are a function of the magnitude of the sensed pressure level and the magnitude of the reference pressure level.

22. An apparatus according to claim 21 including means for varying the reference pressure signal to thereby vary the duration of the energization time subintervals.

23. An apparatus according to claim 22 in which said means for generating a reference pressure signal comprises means for generating such a signal which is representative of the magnitude of the average water pressure at the location spaced from the pivot.

24. An apparatus according to claim 22 in which said control means includes means for periodically energizing said drive motor for energization time subintervals of a minimum duration independent of the magnitude of the sensed pressure in the line, such that the drive motor is energized to move the line a minimum distance during each such energization time subinterval.

25. An apparatus according to claim 21 in which the energization time subintervals are proportional to the square root of the quotient of the magnitude of the sensed pressure level divided by the magnitude of the reference pressure level.

26. A drive motor control apparatus for a center pivot irrigation line having plural towers, a drive motor at one of such towers and a timer for periodically transmitting a control signal to the drive motor, the drive motor bring energized in response to the control signal so as to move the line about its pivot for the duration of the control signal, comprising;
means for interrupting the transmission of the control signal to the drive motor;
control signal generator means for generating a replacement control signal of a duration which varies with variations in the magnitude of pressure in the line at a preselected location;
means for transmitting said replacement control signal to the drive motor so that the drive motor moves the line about its pivot for the duration of the replacement control signal;
said control signal generator means comprising pressure transducer means for sensing the magnitude of water pressure in the line at the preselected location and for producing a sensed pressure signal representing the sensed water pressure magnitude, reference pressure signal generating means for generating a reference pressure signal representing a reference water pressure magnitude, and replacement control signal generator means coupled to said transducer means and to said reference pressure signal generating means for receiving the sensed pressure signal and the reference pressure signal and producing a replacement control signal of a duration which varies with variations in the sensed pressure signal relative to the reference pressure signal.

27. An apparatus according to claim 26 in which said replacement control signal generator produces a replacement control signal of a duration proportional to the square root of the quotient of the sensed pressure signal divided by the reference pressure signal.

28. An apparatus according to claim 26 in which the reference pressure signal represents a desired water pressure magnitude at the pivot.

29. An apparatus according to claim 26 in which the reference pressure signal represents a desired water pressure magnitude at the pivot and in which the sensed pressure signal represents the magnitude of water pressure sensed at a location spaced from the pivot.

* * * * *

UNITED STATES PATENT AND TRADEMARK OFFICE
CERTIFICATE OF CORRECTION

PATENT NO. : 4,303,203
DATED : December 1, 1981
INVENTOR(S) : Robert W. Avery

It is certified that error appears in the above-identified patent and that said Letters Patent are hereby corrected as shown below:

Column 2,-line 23,

"at selected" should be --at a selected--.

Column 7, line 17,

"81" should be --84--.

Column 7, line 25,

"upressurized" should be --unpressurized--.

Signed and Sealed this

Sixteenth Day of March 1982

[SEAL]

Attest:

Attesting Officer

GERALD J. MOSSINGHOFF

Commissioner of Patents and Trademarks